(12) United States Patent
Iimuro et al.

(10) Patent No.: US 9,597,912 B2
(45) Date of Patent: Mar. 21, 2017

(54) COMPOSITION FOR PROTECTION LAYER AND THERMAL RECORDING MATERIAL

(71) Applicant: MITSUI CHEMICALS, INC., Tokyo (JP)

(72) Inventors: Yoshifumi Iimuro, Ichihara (JP); Toshihiro Yoshimura, Ichihara (JP); Akinori Etoh, Bangkok (TH)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/760,851

(22) PCT Filed: Mar. 27, 2014

(86) PCT No.: PCT/JP2014/058847
§ 371 (c)(1),
(2) Date: Jul. 14, 2015

(87) PCT Pub. No.: WO2014/157514
PCT Pub. Date: Oct. 2, 2014

(65) Prior Publication Data
US 2016/0082762 A1    Mar. 24, 2016

(30) Foreign Application Priority Data
Mar. 29, 2013  (JP) ................. 2013-070815

(51) Int. Cl.
*B41M 5/44*   (2006.01)
*B41M 5/50*   (2006.01)
(Continued)

(52) U.S. Cl.
CPC .............. *B41M 5/44* (2013.01); *B41M 5/502* (2013.01); *B41M 5/5254* (2013.01);
(Continued)

(58) Field of Classification Search
CPC . B41M 5/42; B41M 5/44; B41M 5/50; B41M 5/502; B41M 5/5254; B41M 5/5281; B41M 2205/04; B41M 2205/40; C08K 5/21
(Continued)

(56) References Cited

U.S. PATENT DOCUMENTS

2009/0258784 A1   10/2009  Etoh et al.
2010/0248958 A1    9/2010  Etoh et al.

FOREIGN PATENT DOCUMENTS

| JP | S61-037467 A | 2/1986 |
| WO | WO-2007/049621 A1 | 5/2007 |
| WO | WO-2009/048016 A1 | 4/2009 |

OTHER PUBLICATIONS

International Search Report dated Jun. 17, 2014 issued in Application No. PCT/JP2014/058847.
(Continued)

*Primary Examiner* — Bruce H Hess
(74) *Attorney, Agent, or Firm* — Foley & Lardner LLP

(57) ABSTRACT

A composition for a protection layer of a thermal recording material includes emulsion (A) and non-crosslinkable urea compound (B), and emulsion (A) has a pH of 6 or more, and contains copolymer resin (a) produced by copolymerizing reactive monomer component (a') containing at least a vinyl monomer component having a carboxyl group and a vinyl monomer component that is copolymerizable with the vinyl monomer component having a carboxyl group.

7 Claims, 1 Drawing Sheet

(51) Int. Cl.
 *B41M 5/52* (2006.01)
 *C08K 5/21* (2006.01)
(52) U.S. Cl.
 CPC ....... *B41M 5/5281* (2013.01); *B41M 2205/04* (2013.01); *B41M 2205/40* (2013.01); *C08K 5/21* (2013.01)
(58) Field of Classification Search
 USPC .............................. 428/32.39; 524/212, 216
 See application file for complete search history.

(56) References Cited

OTHER PUBLICATIONS

International Preliminary Report on Patentability issued in PCT/JP2014/058847 issued Sep. 29, 2015 (with English translation).
Extended European Search Report issued in EP Patent Application No. 14775395.8 mailed Jan. 19, 2017.

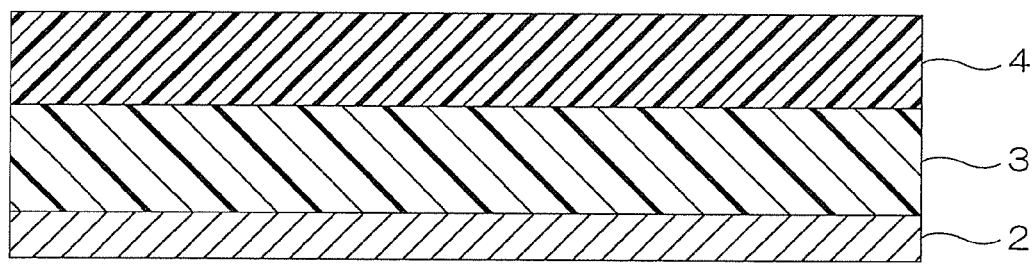
1

COMPOSITION FOR PROTECTION LAYER AND THERMAL RECORDING MATERIAL

CROSS REFERENCE TO RELATED APPLICATIONS

This application is the National Phase of PCT/JP2014/058847, filed Mar. 27, 2014, which claims priority to Japanese Application No. 2013-070815, filed Mar. 29, 2013.

TECHNICAL FIELD

The present invention relates to a composition for a protection layer, or a thermal recording material including a protection layer formed from the composition for a protection layer.

BACKGROUND ART

A thermal recording material including a thermal recording layer formed on a support such as paper and a plastic film is widely used for, for example, output sheets for facsimiles, industrial measurement terminals, medical terminals, handy terminals, POS systems, and ticket dispenser systems. In a thermal recording material, in order protect the thermal recording layer from, for example, water, plasticizers, oils and fats, and solvents, a protection layer is formed on a thermal recording layer.

Patent Document 1 below has examined, as a material used for such a protection layer, an emulsion of a copolymer resin composed of a vinyl monomer component having a carboxyl group and a vinyl monomer that is copolymerizable with that.

CITATION LIST

Patent Document

Patent Document 1 WO 2007/049621

SUMMARY OF THE INVENTION

Problem to be Solved by the Invention

The protection layer described in Patent Document 1 is excellent in durability, especially in water resistance. However, further improvement is necessary for plasticizer resistance, and further improvement in water resistance is also demanded.

Thus, it is an object of the present invention to provide a preferable material for a protection layer of a thermal recording material excellent in water resistance and plasticizer resistance.

Means for Solving the Problem

A composition for a protection layer of a thermal recording material of the present invention includes emulsion (A) and non-crosslinkable urea compound (B),
wherein the emulsion (A) has a pH of 6 or more, and contains copolymer resin (a) produced by copolymerizing reactive monomer component (a') containing at least a vinyl monomer component having a carboxyl group and a vinyl monomer component that is copolymerizable with the vinyl monomer component having a carboxyl group.

It is preferable that in the composition for a protection layer of a thermal recording material of the present invention, (1) 1 to 40 parts by mass of the vinyl monomer component having a carboxyl group is contained in 100 parts by mass of the reactive monomer component (a'), (2) the copolymer resin (a) has a SP value of 9.5 (cal/cm$^3$)$^{1/2}$ or more, and (3) the copolymer resin (a) has a glass transition temperature of 20 to 130° C.

It is preferable that in the composition for a protection layer of a thermal recording material of the present invention, 15 to 90 parts by mass of (meth)acrylonitrile is contained in 100 parts by mass of the reactive monomer component (a').

It is preferable that in the composition for a protection layer of a thermal recording material of the present invention, 0.1 to 100 parts by mass of the non-crosslinkable urea compound (B) is contained relative to 100 parts by mass of the copolymer resin (a).

It is preferable that in the composition for a protection layer of a thermal recording material of the present invention, the non-crosslinkable urea compound (B) is a urea or urea derivative having 1 or less methylol group in its molecule.

It is preferable that in the composition for a protection layer of a thermal recording material of the present invention, the non-crosslinkable urea compound (B) is a compound represented by formula (1) or formula (2) below.

[Chemical Formula 1]

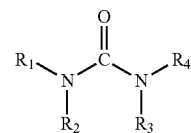

(1)

(in formula (1) above, R$_1$ to R$_4$ respectively and independently represents a hydrogen atom, or an alkyl group that has 1 to 12 carbon atoms and that may have a hydroxyl group; and two or more of R$_1$ to R$_4$ do not simultaneously have hydroxyl groups.)

[Chemical Formula 2]

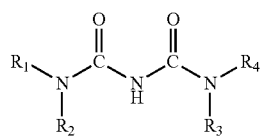

(2)

(in formula (2) above, R$_1$ to R$_4$ respectively and independently represents a hydrogen atom, or an alkyl group that has 1 to 12 carbon atoms and that may have a hydroxyl group; and two or more of R$_1$ to R$_4$ do not simultaneously have hydroxyl groups.)

It is preferable that in the composition for a protection layer of a thermal recording material of the present invention, the non-crosslinkable urea compound (B) is at least one compound selected from the group consisting of urea, 1-alkyl urea, 1,1-dialkyl urea, 1,3-dialkyl urea, 1-hydroxyalkyl urea, and biuret.

A thermal recording material of the present invention includes a support, a thermal recording layer, and a protection layer in this sequence, wherein the protection layer is formed from a composition for a protection layer including emulsion (A) and non-crosslinkable urea compound (B), the emulsion (A) has a pH of 6 or more, and contains copolymer resin (a) produced by copolymerizing reactive monomer component (a') containing at least a vinyl monomer component having a carboxyl group and a vinyl monomer component that is copolymerizable with the vinyl monomer component having a carboxyl group.

Effect of the Invention

A composition for a protection layer of the present invention, and a thermal recording material including the protection layer formed from the composition for a protection layer are excellent in water resistance and plasticizer resistance.

BRIEF DESCRIPTION OF THE DRAWINGS

FIG. 1 shows an embodiment of the thermal recording material of the present invention.

DESCRIPTION OF EMBODIMENTS

In the following, a composition for a protection layer and a thermal recording material according to the present invention are described in detail. In the present invention, for the solubility parameter (SP value/unit; $(cal/cm^3)^{1/2}$) and the glass transition temperature (Tg/unit; °C.), values calculated with CHEOPS (version 4.0) calculation software of Million Zillion Software are used. The calculation method used in the calculation software is described in Computational Materials Science of Polymers (A. A. Askadskii, Cambridge Intl Science Pub (2005 Dec. 30)), Chapter XII.

The thermal recording material of the present invention is composed of a support, a thermal recording layer formed on the support, and a protection layer formed on the thermal recording layer.

The protection layer is formed from the composition for a protection layer (thermal recording layer protection material) of the present invention, and the composition for a protection layer includes emulsion (A) of copolymer resin (a) produced by copolymerizing reactive monomer component (a') containing at least a vinyl monomer component having a carboxyl group and a vinyl monomer component copolymerizable with the vinyl monomer component having a carboxyl group; and non-crosslinkable urea compound (B).

<Copolymer Resin (a)>

The copolymer resin (a) in the present invention is produced by copolymerizing reactive monomer component (a') including a vinyl monomer component having a carboxyl group and a vinyl monomer component copolymerizable with the vinyl monomer component having a carboxyl group.

The vinyl monomer having a carboxyl group included in the reactive monomer component (a') is essential for securing polymerization stability when producing emulsion (A) of copolymer resin (a), and also has effects of increasing film-forming properties by neutralizing with a base after polymerization to hydrate, swell, and soften the resin particles. Furthermore, it also has functions to increase dispersiveness and connectivity of various fillers added as necessary. It also functions as a reaction group with a crosslinking agent further used in combination as necessary.

Examples of the vinyl monomer having a carboxyl group include ethylenic unsaturated monobasic carboxylic acid such as acrylic acid, methacrylic acid, and crotonic acid; ethylenic unsaturated dibasic carboxylic acid such as itaconic acid, maleic acid, and fumaric acid; monoalkyl ester of these; and at least one, or two of these are used in combination.

The vinyl monomer having a carboxyl group contained in 100 parts by mass of the reactive monomer component (a') is preferably in the range of 1 to 40 parts by mass, more preferably 3 to 35 parts by mass, even more preferably 4 to 20 parts by mass, particularly preferably 5 to 10 parts by mass. With the amount less than the above lower limit, polymerization stability may not be sufficient, and even with neutralization, swelling and softening of the resin particles and film-forming properties may not be sufficient. With the amount more than the above upper limit, water resistance of the protection layer may not be sufficient, and thickening and gelling may be caused during neutralization and adjustment.

Examples of the vinyl monomer component that is copolymerizable with the vinyl monomer component having a carboxyl group contained in the reactive monomer component (a') in the present invention include, other than (meth) acrylonitrile to be described later, alkyl (meth)acrylates such as methyl (meth)acrylate and ethyl (meth)acrylate; aromatic vinyl monomers such as styrene and α-methylstyrene; amide group-containing vinyl monomers such as (meth) acrylamide; hydroxyl group-containing vinyl monomers such as (meth)2-hydroxyethyl acrylate; glycidyl group-containing vinyl monomers such as glycidyl (meth)acrylate; amino group-containing vinyl monomers such as N,N-dimethylaminoethyl (meth)acrylate; acetoacetoxy group-containing vinyl monomers such as acetoacetoxy ethyl (meth)acrylate; phosphoric acid group-containing monomers such as 2-methacryloyloxyethyl acid phosphate; functional group-containing vinyl monomers such as sulfonate-containing monomer such as styrene sulfonate; vinyl esters such as vinyl acetate and vinyl propionate; N-substituted unsaturated carboxylic acid amides such as N-methylol(meth) acrylamide; heterocyclic vinyl compounds such as vinyl pyrrolidone; vinylidene halide compounds such as vinylidene chloride and vinylidene fluoride; α-olefins such as ethylene and propylene; and dienes such as butadiene. One or two or more of these are used in combination. Examples of the copolymerizable vinyl monomer further include cyano group-containing vinyl monomers similar to (meth)acrylonitrile. As necessary, crosslinkable vinyl monomers may be used, and examples of such a monomer include methylenebis(meth)acrylamide, divinylbenzene, and polyethylene glycol chain-containing di(meth)acrylate. Those having two or more vinyl groups can also be used as a crosslinkable vinyl monomer.

Use of (meth)acrylonitrile as the vinyl monomer component that is copolymerizable with the vinyl monomer component having a carboxyl group contained in the reactive monomer component (a') allows for improvement in chemical resistance such as plasticizer resistance, oil and grease resistance, and solvent resistance. When the reactive monomer component (a') contains (meth)acrylonitrile, the mass ratio thereof in 100 parts by mass of the reactive monomer component (a') is not particularly set as long as the object of the present invention is not damaged, but preferably, 15 to 90 parts by mass, more preferably 20 to 85 parts by mass, even more preferably 25 to 80 parts by mass, particularly preferably 40 to 60 parts by mass. When the amount of the (meth)acrylonitrile used in not in the above range, chemical resistance and film-forming properties cannot be balanced.

When (meth)acrylonitrile is used as a main component as a vinyl monomer component that is copolymerizable with the vinyl monomer component having a carboxyl group contained in the reactive monomer component (a'), by setting the solubility parameter (SP value) of the copolymer resin (a) to 10.8 $(cal/cm^3)^{1/2}$ or more, chemical resistance such as plasticizer resistance, oil and grease resistance, and solvent resistance can be significantly increased. When the solubility parameter is less than the lower limit, the plasticizer and organic solvent penetrates into the protection layer (between the molecules of the resin) to intrude into the thermal layer, which may cause inferior chemical resistance such as unnecessary color development and fading. In this case, the glass transition temperature (Tg) of the copolymer resin (a) is preferably in the range of 20 to 130° C. The glass transition temperature (Tg) of the copolymer resin (a) less than the lower limit causes poor heat resistance, and the glass transition temperature (Tg) of the copolymer resin (a) more than the upper limit may cause poor film-forming properties.

When using (meth)acrylonitrile as the vinyl monomer component that is copolymerizable with the vinyl monomer component having a carboxyl group contained in the reactive monomer component (a'), the other copolymerizable vinyl monomer component shown above can also be used suitably in combination in the range of solubility parameter (SP value) and glass transition temperature (Tg) of copolymer resin (a) to be described later.

Examples of the method for producing the emulsion (A) of the copolymer resin (a) include known methods such as emulsion polymerization, dispersion polymerization, fine suspension polymerization, and suspension polymerization, and preferably, emulsion polymerization is used.

Use of emulsion polymerization allows for production of an emulsion having primary particles with a homogenous particle size.

In emulsion polymerization, for example, an emulsion of the reactive monomer component (a') containing a vinyl monomer component having a carboxyl group and a vinyl monomer component that is copolymerizable with the vinyl monomer component having a carboxyl group is polymerized.

To be specific, in this method, for example, the vinyl monomer component having a carboxyl group, the vinyl monomer component that is copolymerizable with the vinyl monomer component having a carboxyl group, a radical polymerization initiator, water, and as necessary a surfactant (emulsifier) are blended, and the reactive monomer component (a') containing the vinyl monomer component having a carboxyl group and the vinyl monomer component that is copolymerizable with the vinyl monomer component having a carboxyl group are subjected to emulsion polymerization in water to produce emulsion (A) of copolymer resin (a).

When producing the emulsion (A) of the copolymer resin (a), as necessary, an emulsifier may be used to give stability. For example, anionic surfactants such as higher alcohol sulfate, alkylbenzene sulfonate, aliphatic sulfonate, and alkyldiphenylethersulfonate, and nonionic surfactants such as alkylester, alkylphenylether, and alkylether of polyethylene glycol can be used singly or used in combination of two or more. The amount of such emulsifiers to be used is not particularly limited, but in view of water resistance of resin, preferably the minimum necessary amount is used, and to be specific, 0.01 to 10 parts by mass, more preferably 0.01 to 5 parts by mass of the emulsifier is used relative to 100 parts by mass of a total of the vinyl monomer component having a carboxyl group and the vinyl monomer component that is copolymerizable with the vinyl monomer component having a carboxyl group.

Examples of the polymerization initiator used when the emulsion (A) of the copolymer resin (a) is produced include water-soluble initiators such as persulfate, hydrogen peroxide, organic hydroperoxide, and azobiscyanovaleric acid; oil-soluble initiators such as azobisisobutyronitrile and benzoyl peroxide; or a redox initiator combined with a reducing agent. The amount of the polymerization initiator to be used is not specifically limited, and can be set in accordance with known techniques, and preferably used in the range of 0.1 to 10 parts by mass, more preferably 0.1 to 5 parts by mass relative to 100 parts by mass of a total of the vinyl monomer component having a carboxyl group and the vinyl monomer component that is copolymerizable with the vinyl monomer component having a carboxyl group.

Furthermore, when producing the emulsion (A) of the copolymer resin (a), as necessary, a molecular weight modifier (chain transfer agent) can be used, examples of which include mercaptans such as octylmercaptan, n-dodecylmercaptan, and t-dodecylmercaptan, low molecular weight halogen compounds, 1-thioglycerol, α-methylstyrene dimer, and methallyl sulfonate.

The emulsion (A) of copolymer resin (a) is neutralized and adjusted with a base, and as a neutralizing agent for neutralization, ammonia (water) is used. Other examples of the neutralizing agent also include sodium hydroxide, potassium hydroxide, various amines, but water resistance of the protection layer, damages to the thermal head, or desensitization at the time of thermal color development may be caused. When the ammonia (water) is used, these negative effects are not caused, and a relatively low temperature allows for easy removal, and therefore water resistance after the formation of the protection layer can be exhibited for a short period of time. In view of stability of dispersion of the emulsion, the emulsion (A) of the copolymer resin (a) has a pH of 6 or more, preferably 6.2 or more, and preferably 11 or less, more preferably 10 or less.

After neutralization of the emulsion (A) of the copolymer resin (a), the emulsion (A) can be stirred as is at 40 to 90° C. for 30 min to 12 hours for swelling and softening.

The copolymer resin (a) thus obtained preferably has a solubility parameter (SP value) of 9.5 $(cal/cm^3)^{1/2}$ or more, more preferably 9.5 to 13.0 $(cal/cm^3)^{1/2}$, even more preferably 10.0 to 12.5 $(cal/cm^3)^{1/2}$. When the solubility parameter is more than the upper limit, hydrophilicity of the copolymer resin emulsion becomes too high, and excellent water resistance cannot be obtained, and also the production of the emulsion (A) of the copolymer resin (a) of the present invention itself may become difficult. When the solubility parameter is less than the lower limit, strength of the protection layer coating is reduced when the protection layer is formed, and sufficient adhesive strength with the thermal recording body may not be obtained, which may cause problems of peeling off of the protection layer from the thermal recording body.

The copolymer resin (a) has a glass transition temperature (Tg) of preferably 20 to 130° C., more preferably 25 to 125° C., even more preferably 30 to 100° C., and particularly preferably 35 to 80° C., more particularly preferably 40 to 75° C. When the copolymer resin (a) has a glass transition temperature (Tg) of less than the lower limit above, heat resistance may be poor, and when the copolymer resin (a)

has a glass transition temperature (Tg) of more than the upper limit above, problems of poor film-forming properties may be caused.

The minimum film-forming temperature (MFT/unit; ° C.) of the emulsion (A) of the copolymer resin (a) can be adjusted by heating the resin particles under alkaline for swelling and softening, other than the resin composition and the resin Tg, and even if the resin has the same composition and Tg, changing the degree of neutralization allows for adjustment of MFT. The MFT is preferably 5° C. or more, and the upper limit is preferably 50° C. The MFT within the range described above is preferable in that storage stability of the emulsion, strength of the coating, and running stability at the time of thermal printing, film-forming properties are all excellent.

As described above, the MFT is an important index of polymer characteristics. The MFT is an index related to: (1) glass transition temperature of the copolymer resin, (2) SP value of the copolymer resin, (3) acidity of the copolymer resin, (4) degree of neutralization (basicity relative to the acidity of the copolymer resin), (5) pH of the emulsion, and (6) temperature conditions (heating conditions) at the time of emulsion neutralization or after neutralization. The minimum film-forming temperature (MFT) can be determined based on JIS K6828-2.

The average particle size (number average) of the copolymer resin (a) of the present invention is not particularly limited, and preferably the average particle size (number average) is 50 to 500 nm, more preferably 70 to 400 nm. When the average particle size is too small, that is, less than the lower limit above, the emulsion viscosity may become excessively high. In this case, because the resin concentration at the time of production has to be kept low, drying of the protection layer coating liquid becomes slow, and productivity of the thermal recording material of the present invention may be hindered, which is not preferable in view of economy. Meanwhile, when the average particle size is too large, that is, more than the upper limit, a fine protection layer is not easily formed, and therefore storage stability of the thermal recording layer may be insufficient. The particle size can be manipulated based on the composition of the copolymer resin emulsion and the surfactant, and is adjusted to be in the range described above.

The weight-average molecular weight of the copolymer resin (a) of the present invention is not particularly limited, but preferably is 10000 to 2000000, more preferably 50000 to 1000000. When the molecular weight is too small, that is, when the molecular weight is less than the lower limit, strength of the protection layer may be reduced, and when the molecular weight is too large, that is, when the molecular weight is more than the upper limit, disadvantages such as high viscosity and reduction in film-forming properties are easily caused. The weight-average molecular weight is a polystyrene-based value measured by gel permeation chromatography method.

The emulsion (A) of copolymer resin (a) of the present invention has a solid content concentration of, for example, 10 mass % or more, preferably 15 mass % or more, and for example, 60 mass % or less, preferably 50 mass % or less. When the solid content concentration is too small, that is, less than the lower limit above, drying of the protection layer coating liquid slows, which may hinder productivity of the thermal recording material of the present invention. When the solid content concentration is too large, that is, more than the upper limit, stability at the time of production and storage of the emulsion may be reduced.

<Non-Crosslinkable Urea Compound (B)>

The protection layer used in the present invention is formed from a composition for a protection layer containing the emulsion (A) and the non-crosslinkable urea compound (B) above.

The non-crosslinkable urea compound (B) of the present invention is not particularly limited, as long as it is a urea compound which has a molecular weight of 1000 or less, and which does not form a crosslinking structure with the polymer that forms the particles.

Examples of the non-crosslinkable urea compound (B) include, for example, a urea or urea derivative having one or less methylol group in its molecule.

Examples of the non-crosslinkable urea compound (B) include, for example, a compound represented by formula (1) or formula (2) below.

[Chemical Formula 1]

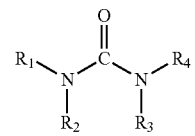

(1)

(in formula (1) above, $R_1$ to $R_4$ respectively and independently represents a hydrogen atom or an alkyl group that has 1 to 12 carbon atoms and that may have a hydroxyl group, and two or more of $R_1$ to $R_4$ do not simultaneously have hydroxyl groups.)

[Chemical Formula 2]

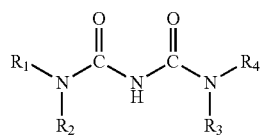

(2)

(in formula (2) above, $R_1$ to $R_4$ respectively and independently represents a hydrogen atom or an alkyl group that has 1 to 12 carbon atoms and that may have a hydroxyl group, and two or more of $R_1$ to $R_4$ do not simultaneously have hydroxyl groups.)

$R_1$ to $R_4$ respectively and independently represents a hydrogen atom, or an alkyl group that has 1 to 12 carbon atoms and that may have a hydroxyl group such as straight chain alkyl groups including a methyl group, an ethyl group, a n-propyl group, a n-butyl group, and n-hexyl; branched alkyl groups including an i-propyl group, an i-butyl group, and a t-butyl group; monohydroxy alkyl groups including 2-hydroxyethyl group, and 3-hydroxypropyl group.

Examples of $R_1$ to $R_4$ include preferably a hydrogen atom and an alkyl group having 1 to 9 carbon atoms, and more preferably a hydrogen atom, a methyl group, and an ethyl group are used.

However, two or more of $R_1$ to $R_4$ do not simultaneously have hydroxyl groups. That is, when one of $R_1$ to $R_4$ is an alkyl group that has a hydroxyl group and has 1 to 12 carbon atoms, the remaining three is a hydrogen atom, or an alkyl group that has no hydroxyl group and has 1 to 12 carbon atoms.

In formula (1) and (2) above, preferably, two of $R_1$ to $R_4$ is an alkyl group that has no hydroxyl group and has 1 to 12 carbon atoms, and the remaining two are hydrogen atoms; one of $R_1$ to $R_4$ is an alkyl group that has a hydroxyl group and that has 1 to 12 carbon atoms, and remaining three are hydrogen atoms; or all of $R_1$ to $R_4$ are hydrogen atoms.

More preferably, two of $R_1$ to $R_4$ are an alkyl group that has no hydroxyl group and has 1 to 12 carbon atoms, and the remaining two are hydrogen atoms, or all of $R_1$ to $R_4$ are hydrogen atoms. Even more preferably, two of $R_1$ to $R_4$ are an alkyl group that has no hydroxyl group and has 1 to 12 carbon atoms, and the remaining two are hydrogen atoms.

Furthermore, examples of the non-crosslinkable urea compound (B) include urea; monoalkyl urea such as 1-alkylurea; dialkylurea such as 1,1-dialkylurea and 1,3-dialkylurea; hydroxyl alkyl urea such as 1-hydroxyalkylurea; and urea derivatives such as biurets of the monoalkyl urea mentioned above, the dialkyl urea mentioned above, and the hydroxyl alkyl urea mentioned above.

Examples of 1-monoalkyl urea include 1-methylurea, and 1-ethylurea, and preferably, 1-methylurea is used.

Examples of 1,1-dialkylurea include 1,1-dimethylurea, and 1,1-diethylurea, and preferably, 1,1-dimethylurea is used.

Examples of 1,3-dialkylurea include 1,3-dimethylurea and 1,3-diethylurea, and preferably, 1,3-dimethylurea.

Examples of 1-hydroxyalkylurea include 1-(2-hydroxyethyl)urea and 1-(3-hydroxypropyl)urea.

Examples of the biuret of urea, the monoalkylurea, the dialkylurea, and hydroxyalkylurea include biuret (dimer of urea, $C_2H_5N_3O_2$), and N,N-dimethylbiuret, and preferably, biuret (dimer of urea, $C_2H_5N_3O_2$) is used.

Examples of the non-crosslinkable urea compound (B) include, preferably, urea, 1-alkylurea, 1,1-dialkylurea, 1,3-dialkylurea, 1-hydroxyalkylurea, and biuret (dimer of urea, $C_2H_5N_3O_2$), and more preferably, urea, 1,1-dialkylurea, and 1,3-dialkylurea are used. Even more preferably, urea or 1,1-dimethylurea or 1,3-dimethylurea is used.

The non-crosslinkable urea compound (B) contained in the composition for a protection layer allows for production of the protection layer having excellent water resistance and plasticizer resistance. Although the reasons are unknown, it can be assumed that effects based on the hydrogen bond of the non-crosslinkable urea compound (B) that exhibits hydrogen bond properties causes a protection layer having excellent water resistance and plasticizer resistance.

The mixing ratio of the non-crosslinkable urea compound (B) relative to 100 parts by mass (solid content) of the copolymer resin (a) contained in the emulsion (A) is, for example, 0.1 parts by mass or more, preferably 1 part by mass or more, more preferably 2 parts by mass or more, even more preferably 5 parts by mass or more, particularly preferably 15 parts by mass or more, and, for example, 100 parts by mass or less, preferably 80 parts by mass or less, more preferably 70 parts by mass or less, even more preferably 65 parts by mass or less, particularly preferably 60 parts by mass or less. When the mixing ratio of the non-crosslinkable urea compound is within the above-described range, there is a tendency of achieving sufficient water resistance and plasticizer resistance of the protection layer.

As a constituent component of the composition for a protection layer in the present invention, in addition to the copolymer resin (a) and the non-crosslinkable urea derivative (B), a known copolymer resin may be contained, for example, as a lubricant, in the range that does not reduce the effects of the present invention.

In the present invention, the composition for a protection layer may contain a filler (pigment) as necessary. The amount to be added is not particularly limited, but the type and the amount can be suitably selected in the range that does not damage the object of the present invention. Examples of the filler include inorganic fillers such as calcium carbonate, magnesium carbonate, kaolin, talc, clay, aluminum hydroxide, barium sulfate, silicon oxide, titanium oxide, zinc oxide, and colloidal silica, and organic microparticles such as urea-formalin resin and polystyrene micropowder, and these can be used singly or in combination.

Examples of components used other than the filler as necessary include higher fatty acid metal salt such as zinc stearate for further improving running stability, lubricants such as higher fatty acid amide, an ultraviolet absorber, an antioxidant, an antifoaming agent, a wetting agent, a viscosity adjustment agent, other auxiliary agents, and an additive.

The protection layer formed from the composition for a protection layer mainly composed of the copolymer resin (a) of the present invention has sufficient heat resistance as a thermal recording material, but further containing a polyolefin copolymer resin in the composition for a protection layer allows for significant improvement in running stability at the time of thermal printing, anti-sticking properties, and heat resistance. The polyolefin copolymer resin in the present invention is composed of at least one selected from the group consisting of a single α-olefin having 2 to 16 carbon atoms and a copolymer of two or more α-olefin having 2 to 16 carbon atoms, and supports functions to significantly improve running stability necessary for protection layer, anti-sticking properties, and heat resistance. Examples of the polyolefin copolymer resin include a homopolymer of α-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, and a copolymer of two or more of these, but in particular, as α-olefin, ethylene, propylene, and 1-butene are preferably used.

The particle size of the polyolefin copolymer resin emulsion is not particularly limited, but is preferably small, and is 2000 nm or less, more preferably 1000 nm or less. When the particle size is more than the upper limit, separation to the upper layer in the emulsion (A) of copolymer resin (a) occur and homogenous dispersion fails, which may cause inhomogeneous protection layer and may not stabilize physical properties of the protection layer. When the particle size is the upper limit or less, stability, and homogenous and independent presence in the system can be achieved. The molecular weight of the polyolefin copolymer resin is not particularly limited, but preferably has a weight-average molecular weight of 10000 or less, and preferably has a weight-average molecular weight of 1000 or more. When the molecular weight is more than the upper limit, effects of improvement in running stability at the time of thermal printing, anti-sticking properties, and heat resistance may not be brought out. The weight-average molecular weight is a polyethylene-based value measured by gel permeation chromatography method.

The polyolefin copolymer resin has a solid content mass ratio relative to 100 parts by mass of the copolymer resin (a) in the range of 0.5 to 50 parts by mass, preferably 2 to 40 parts by mass, more preferably 3 to 35 parts by mass, even more preferably 5 to 30 parts by mass, particularly preferably 10 to 25 parts by mass, and more particularly preferably 15 to 20 parts by mass. When the polyolefin copolymer resin has a solid content mass ratio relative to 100 parts by mass of the copolymer resin (a) of more than the upper limit, film-forming properties of the protection layer may become inferior and coating failure may easily be caused, and also when printing thereon, ink adhesion may be hindered. When the polyolefin copolymer resin has a solid content mass ratio relative to 100 parts by mass of the copolymer resin (a) of less than the above lower limit, effects of further functional improvement in running stability and heat resistance stability may not be brought out.

In the present invention, addition of a cross-linking agent to the composition for a protection layer is not particularly necessary, but use of the cross-linking agent is not a problem at all as long as the effects of the present invention are not reduced, and can be applied suitably without limitation depending on the situation. The cross-linking agent in such a case has to be selected suitably from materials capable of reacting with the carboxyl group contained in the copolymer resin (a) and various functional groups (hydroxyl group, methylol group, amino group, acetoacetyl group, and glycidyl group) introduced from other copolymerizable vinyl monomers, for example, glyoxal, polyhydric alcohol glycidyl ether, ketene dimer, dialdehyde starch, epichlorohydrin modified polyamide.amine, ammonium zirconium carbonate, aluminum sulfate, calcium chloride, and boric acid.

As a constituent resin component for a composition for a protection layer containing copolymer resin (a) in the present invention, in addition to the copolymer resin (a) of the present invention, as necessary, other known aqueous resins can be used in combination. Examples of such a resin include natural resin (for example, sodium alginate, starch, casein, and cellulose) and synthetic resin (polyvinyl alcohol, various synthetic rubber latex, polyurethane, epoxy, vinyl chloride, and vinylidene chloride). Of these examples of resins, modified polyvinyl alcohols are preferable, and examples of the modified polyvinyl alcohols include carboxyl-modified, epoxy-modified, silanol-modified, acetoacetyl-modified, amino-modified, olefin-modified, amide-modified, and nitrile-modified ones. However, the resins are not limited to these.

<Thermal Recording Material>

The thermal recording material of the present invention is composed of a support, a thermal recording layer formed on the support, and a protection layer formed on the thermal recording layer, and the protection layer is formed from the composition for a protection layer containing at least emulsion (A) of copolymer resin (a) and non-crosslinkable urea compound (B).

An embodiment of the thermal recording material of the present invention is shown in FIG. 1.

A thermal recording material 1 in one embodiment of the present invention includes, as shown in FIG. 1, a support 2, a thermal recording layer 3 disposed on the support 2, and a protection layer 4 disposed on the thermal recording layer 3.

For the support 2, preferably, paper, a plastic sheet, or a film is used. Examples of the thermal recording layer 3 are not particularly limited: a known thermal recording layer is used, and the thermal recording layer 3 is formed by a known method. An undercoat layer can be provided below the thermal recording layer 3.

The protection layer 4 is formed by applying the composition for a protection layer preferably on the thermal recording layer 3 with, for example, an air knife coater, gravure coater, and roll coater, in a mass of 1 to 10 g/m² after being dried, and then drying the composition for a protection layer.

In the present invention, the protection layer is provided, without limitation, in addition to the portions such as on the thermal recording layer and behind the support, on portions that allows for improvement in functions of the protection layer.

Furthermore, the color development system in the thermal recording layer portion of the present invention is not particularly limited as well. Examples of these color development systems include a system in which acidic substance represented by leuco dye and phenolic substances are used, a system in which an imino compound and an isocyanate compound are used, and a system in which diazo compound and a coupler are used.

When higher glossiness and specular glossiness are to be given to the protection layer of the present invention, the surface can further be subjected to cast treatment, or a method can be used in which a protection layer coating liquid is applied to a specular gloss metal drum or a smooth PET film and dried, and then the coating layer is pressure contacted and transferred to the thermal recording layer surface.

EXAMPLES

In the following, the present invention is described in detail based on Examples, but the present invention is not limited to these Examples. In Examples, parts and % represent parts by mass and mass % unless otherwise specified. Values in Examples below can be replaced with those corresponding values described in the embodiments (that is, the upper limit value or the lower limit value).

Production Example 1

A separable flask equipped with a mixer and a reflux condenser was charged with 300 parts of deionized water and 0.5 parts of sodium dodecyl sulfate, and after replacement with nitrogen gas, the temperature was increased to 75° C. After the temperature increase, 0.5 parts of potassium persulfate was added to the mixture, and then after an emulsified vinyl monomer of the composition below was continuously added taking about 5 hours, the mixture was aged at 75° C. for 2 hours, thereby completing polymerization. After the completion, ammonia water was then added to alkalify the mixture, and then the temperature was kept for further 3 hours to subject the mixture to swelling and softening. Thereafter, the mixture was cooled to room temperature, thereby producing resin emulsion (A-1) having a solid content concentration of about 20% and an adjusted pH of about 7.5.

| Emulsified vinyl monomer composition | |
|---|---|
| Acrylonitrile (AN) | 51 parts |
| Butyl acrylate (BA) | 18 parts |
| 2-Hydroxyethyl methacrylate (HEMA) | 5 parts |
| Methacrylic acid (Mac) | 8 parts |
| Methacrylamide (Mam) | 18 parts |
| Deionized water | 80 parts |
| Sodium dodecyl sulfate | 0.3 parts |

Production Example 2

Resin emulsion (A-2) having an adjusted pH of about 7.5 and a solid content concentration of about 20% was produced in the same manner as in Production Example 1, except that the vinyl monomer composition was changed to the composition shown below.

| Emulsified vinyl monomer composition | |
|---|---|
| Acrylonitrile (AN) | 56 parts |
| Butyl acrylate (BA) | 16 parts |
| Methacrylic acid (Mac) | 8 parts |
| Methacrylamide (Mam) | 20 parts |
| Deionized water | 80 parts |
| Sodium dodecyl sulfate | 0.3 parts |

Production Example 3

Resin emulsion (A-3) having an adjusted pH of about 7.8 and a solid content concentration of about 20% was produced in the same manner as in Production Example 1, except that the vinyl monomer composition was changed to the composition shown below.

| Emulsified vinyl monomer composition | |
|---|---|
| Acrylonitrile (AN) | 55 parts |
| Butyl acrylate (BA) | 21 parts |
| Methacrylic acid (Mac) | 9 parts |
| Styrene (St) | 15 parts |
| Deionized water | 80 parts |
| Sodium dodecylbenzene sulphonate | 0.3 parts |

Production Example 4

Resin emulsion (A-4) having an adjusted pH of about 7.2 and a solid content concentration of about 20% was produced in the same manner as in Production Example 1, except that the vinyl monomer composition was changed to the composition shown below.

| Emulsified vinyl monomer composition | |
|---|---|
| Acrylonitrile (AN) | 45 parts |
| Butyl acrylate (BA) | 26 parts |
| 2-Hydroxyethyl methacrylate (HEMA) | 10 parts |
| Methacrylic acid (Mac) | 6 parts |
| Methacrylamide (Mam) | 13 parts |
| Deionized water | 80 parts |
| Sodium dodecyl sulfate | 0.3 parts |

Production Example 5

Resin emulsion (A-5) having an adjusted pH of about 7.8 and a solid content concentration of about 20% was produced in the same manner as in Production Example 1, except that the vinyl monomer composition was changed to the composition shown below.

| Emulsified vinyl monomer composition | |
|---|---|
| Acrylonitrile (AN) | 50 parts |
| Butyl acrylate (BA) | 25 parts |
| Methyl methacrylate (MMA) | 15 parts |
| Methacrylic acid (Mac) | 10 parts |
| Deionized water | 80 parts |
| Sodium dodecylbenzene sulphonate | 0.3 parts |

Comparative Production Example 1

A separable flask equipped with a mixer and a reflux condenser was charged with 300 parts of deionized water, 0.1 parts of sodium dodecylbenzene sulphonate, and 1.0 part of potassium persulfate, and after replacement with nitrogen gas, the temperature was increased to 70° C. After the temperature increase, emulsified vinyl monomer of the composition below was continuously added taking about 4 hours, and the mixture was aged at 70° C. for 2 hours, thereby completing polymerization. After the completion, ammonia water was then added, and the temperature was kept for further 3 hours to subject the mixture to swelling and softening. Thereafter, the mixture was cooled to room temperature, thereby producing resin emulsion (A-6) having an adjusted pH of about 3.6 and a solid content concentration of about 20%.

| Emulsified vinyl monomer composition | |
|---|---|
| Acrylonitrile (AN) | 20 parts |
| Methyl methacrylate (MMA) | 36 parts |
| 2-Ethylhexyl acrylate (2EHA) | 36 parts |
| 2-Hydroxyethyl methacrylate (HEMA) | 5 parts |
| Methacrylic acid (Mac) | 3 parts |
| Deionized water | 80 parts |
| Sodium dodecylbenzene sulphonate | 0.3 parts |

Table 1 shows the composition, pH, solubility parameter, and glass transition temperature for Production Examples. The pH was measured using a commercially available pH meter (manufactured by TOA DKK, HM-25R) at 25° C., and the solubility parameter (SP value/unit; $(cal/cm^3)^{1/2}$) and glass transition temperature (Tg/unit; ° C.) were calculated by calculation software CHEOPS (Version 4.0) of Million Zillion Software.

TABLE 1

| | | Production Example | | | | | Comparative Production Example 1 |
|---|---|---|---|---|---|---|---|
| | | Production Example 1 | Production Example 2 | Production Example 3 | Production Example 4 | Production Example 5 | |
| Resin Emulsion Name | | A-1 | A-2 | A-3 | A-4 | A-5 | A-6 |
| Composition | AN | 51 | 56 | 55 | 45 | 50 | 20 |
| | BA | 18 | 16 | 21 | 26 | 25 | — |
| | MMA | — | — | — | — | 15 | 36 |
| | 2EHA | — | — | — | — | — | 36 |
| | HEMA | 5 | — | — | 10 | — | 5 |
| | Mac | 8 | 8 | 9 | 6 | 10 | 3 |
| | Mam | 18 | 20 | — | 13 | — | — |
| | St | — | — | 15 | — | — | — |
| Evaluation | pH | 7.5 | 7.5 | 7.8 | 7.2 | 7.8 | 3.6 |
| | SP value | 11.9 | 12.0 | 11.1 | 11.5 | 11.0 | 9.87 |

TABLE 1-continued

|  | Production Example 1 | Production Example 2 | Production Example 3 | Production Example 4 | Production Example 5 | Comparative Production Example 1 |
|---|---|---|---|---|---|---|
| $((cal/cm^3)^{1/2})$ Tg(° C.) | 69 | 78 | 61 | 50 | 51 | 23 |

Abbreviations for the compositions in Table 1 are shown below.

AN acrylonitrile
BA butyl acrylate
MMA methyl methacrylate
2EHA 2-ethylhexyl acrylate
HEMA 2-hydroxyethyl methacrylate
Mac methacrylic acid
Mam methacrylamide
St styrene Next, Examples and Comparative Examples are described: In Examples and Comparative Examples, resin emulsions (A–1) to (A-6) produced in Production Examples 1 to 5 and Comparative Production Example 1 were used in the protection layer for thermal recording materials. In any of Examples and Comparative Example, the composition is shown by parts by mass.

Example 1

A thermal recording material was produced as follows: 100 parts of resin emulsion (A-1) produced in Production Example 1, 100 parts of deionized water, 15 parts of a polyolefin copolymer emulsion having a 40% solid content concentration (Manufactured by Mitsui Chemicals, Inc., CHEMIPEARL W400) as a lubricant, 2.5 parts of urea, and 50 parts of a 65% clay slurry (manufactured by Engelhard, UW-90) dispersed in advance as a filler (pigment) were homogenously mixed; the mixture was applied to a commercially available thermal word processor sheet with no surface treatment with a bar coater so that its dried mass was 2 g/m$^2$; and the mixture was dried (after forcefully drying at 50° C. for 60 seconds, aged at 40° C. for 24 hours).

Example 2

A thermal recording material was produced in the same manner as in Example 1, except that 2.5 parts of urea used in Example 1 was changed to 12.5 parts of urea.

Example 3

A thermal recording material was produced in the same manner as in Example 1, except that 2.5 parts of urea used in Example 1 was changed to 12.5 parts of 1,3-dimethylurea.

Example 4

A thermal recording material was produced in the same manner as in Example 1, except that the resin emulsion was changed to resin emulsion (A-2) produced in Production Example 2.

Example 5

A thermal recording material was produced in the same manner as in Example 4, except that 2.5 parts of urea used in Example 4 was changed to 12.5 parts of 1,3-dimethylurea.

Example 6

A thermal recording material was produced as follows: to 100 parts of resin emulsion (A-3) produced in Production Example 3, 100 parts of deionized water, 10 parts of a polyolefin copolymer emulsion having a 40% solid content concentration (Manufactured by Mitsui Chemicals, Inc., CHEMIPEARL W4005) as a lubricant, 10 parts of 1,3-dimethylurea, and 5 parts of silicon oxide (manufactured by MIZUSAWA INDUSTRIAL CHEMICALS, LTD., MIZU-KASIL P524) as a filler (pigment) were homogenously mixed; thereafter, the mixture was applied to a commercially available thermal word processor sheet with no surface treatment with a bar coater so that its dried mass was 2 g/m$^2$; and the mixture was dried (after forcefully drying at 50° C. for 60 seconds, aged at 40° C. for 24 hours).

Example 7

A thermal recording material was produced as follows: to 100 parts of resin emulsion (A-4) produced in Production Example 4, 100 parts of deionized water, 5 parts of a polyolefin copolymer emulsion having 40% solid content concentration (Manufactured by Mitsui Chemicals, Inc., CHEMIPEARL W401) as a lubricant, 2.5 parts of 1,3-dimethylurea, and 10 parts of a 13% aqueous solution of ammonium zirconium carbonate (manufactured by DAI-ICHI KIGENSO KAGAKU KOGYO CO., LTD., Zircosol AC-7) as a cross-linking agent were homogenously mixed; thereafter, the mixture was applied to a commercially available thermal word processor sheet with no surface treatment with a bar coater so that its dried mass was 2 g/m$^2$; and the mixture was dried (after forcefully drying at 50° C. for 60 seconds, aged at 40° C. for 24 hours).

Example 8

A thermal recording material was produced as follows: to 100 parts of resin emulsion (A-5) produced in Production Example 5, 100 parts of deionized water, 5 parts of zinc stearate (manufactured by CHUKYO YUSHI CO., LTD., HYDERINE Z-8-36) as a lubricant, 2.5 parts of biuret, and 5 parts of a 13% aqueous solution (manufactured by DAI-ICHI KIGENSO KAGAKU KOGYO CO., LTD., Zircosol AC-7) of ammonium zirconium carbonate as a cross-linking agent were homogenously mixed; thereafter, the mixture was applied to a commercially available thermal word processor sheet with no surface treatment with a bar coater so that its dried mass was 2 g/m$^2$; and the mixture was dried (after forcefully drying at 50° C. for 60 seconds, aged at 40° C. for 24 hours).

Example 9

A thermal recording material was produced in the same manner as in Example 8, except that 2.5 parts of biuret used in Example 8 was changed to 2.5 parts of 1,1-dimethylurea.

Comparative Example 1

A thermal recording material was produced in the same manner as in Example 1, except that urea was not used.

Comparative Example 2

A thermal recording material was produced in the same manner as in Example 4, except that urea was not used.

Comparative Example 3

A thermal recording material was produced in the same manner as in Example 6, except that 1,3-dimethylurea was not used.

Comparative Example 4

A thermal recording material was produced in the same manner as in Example 7, except that 1,3-dimethylurea was not used.

Comparative Example 5

A thermal recording material was produced in the same manner as in Example 8, except that biuret was not used.

Comparative Example 6

A thermal recording material was produced in the same manner as in Example 1, except that the resin emulsion was changed to resin emulsion (A-6) produced in Comparative Production Example 1.

Comparative Example 7

A thermal recording material was produced in the same manner as in Comparative Example 6, except that urea was not used.

The thermal recording materials produced in Examples 1 to 9 and Comparative Examples 1 to 7 were evaluated by the following method.

<Running Stability>

A pattern image of solid black print was produced using a thermal printer (manufactured by Ohkura Electric Co., Ltd.: TH-PMX) with the following conditions, and the degree of sound generation (crackling sound) at the time of printing and head contamination were evaluated comprehensively.

| Applied voltage | 23 V |
| Pulse width | 0.8 ms |
| Applied energy | 0.54 mJ/dot |

Good: small printing sound at the time of printing, and no contamination is attached to the printing head after the printing.
OK: slightly louder printing sound at the time of printing, but no contamination on the printing head, and practically no problem.
Bad: contamination is present on the printing head, and peeled protection layer was present on the printed surface as well.

<Plasticizer Resistance>

Images were produced with the same conditions as above, and a transparent polyvinyl chloride film (manufactured by Mitsui Chemicals Fabro, Inc., SAS-350) was attached to the image portion. They were allowed to stand at 40° C. for 24 hours, and then the film was removed. The concentration before and after the attachment was measured with a Macbeth densitometer (manufactured by Macbeth, RD918), and printing density retention rate ((printing density after attachment/printing density before attachment)×100)(%) was determined as a plasticizer resistance (%).

<Water Resistance>

A drop of water was applied on the coating surface of the produced thermal recording body, and the thermal recording bodies were placed on top of the other so that the coating surfaces face each other. A load of 100 g/cm$^2$ was applied, and the thermal recording bodies were allowed to stand under conditions of 40° C./65% RH for 24 hours or more, and then thereafter, the surfaces facing each other were peeled off to determine blocking conditions.
Excellent: no blocking at all, and easily peeled off.
Good: little resistance when peeling, but peeled without problem, and no abnormalities are seen on the coating surface.
Poor: little resistance when peeling, and damages which appear to be defects were seen on some place on the coating surface.
Bad: difficult to be peeled off with strong resistance, and severe damages were present on the coating surface.

Table 2 shows the composition of the thermal recording material and evaluation results.

TABLE 2

| | | | Examples | | | | | |
| --- | --- | --- | --- | --- | --- | --- | --- | --- |
| | | | Example 1 | Example 2 | Example 3 | Example 4 | Example 5 | Example 6 |
| Composition | Resin | Type | A-1 | A-1 | A-1 | A-2 | A-2 | A-3 |
| | | Parts by mass | 100 | 100 | 100 | 100 | 100 | 100 |
| | Filler (Pigment) | Type | UW-90 | UW-90 | UW-90 | UW-90 | UW-90 | Silica |
| | | Parts by mass | 50 | 50 | 50 | 50 | 50 | 5 |
| | Lubricant | Type | W400 | W400 | W400 | W400 | W400 | W4005 |
| | | Parts by mass | 15 | 15 | 15 | 15 | 15 | 10 |
| | Cross- | Type | — | — | — | — | — | — |

TABLE 2-continued

|  |  |  |  |  |  |  |  |  |
|---|---|---|---|---|---|---|---|---|
|  | linking agent | Parts by mass | — | — | — | — | — | — |
|  | Urea | Type | Urea | Urea | 1,3-DMU | Urea | 1,3-DMU | 1,3-DMU |
|  |  | Parts by mass | 2.5 | 12.5 | 12.5 | 2.5 | 12.5 | 10 |
| Evaluation | Running stability |  | Good | Good | Good | Good | Good | Good |
|  | Plasticizer resistance (%) |  | 74.2 | 73.4 | 79.6 | 66.2 | 68.1 | 75.0 |
|  | Water resistance |  | Good | Good | Good | Excellent | Excellent | Excellent |

Examples-Comparative Examples

|  |  |  | Example 7 | Example 8 | Example 9 | Comparative Example 1 | Comparative Example 2 | Comparative Example 3 |
|---|---|---|---|---|---|---|---|---|
| Composition | Resin | Type | A-4 | A-5 | A-5 | A-1 | A-2 | A-3 |
|  |  | Parts by mass | 100 | 100 | 100 | 100 | 100 | 100 |
|  | Filler (Pigment) | Type | — | — | — | UW-90 | UW-90 | Silica |
|  |  | Parts by mass | — | — | — | 50 | 50 | 5 |
|  | Lubricant | Type | W401 | ZnSt | ZnSt | W400 | W400 | W4005 |
|  |  | Parts by mass | 5 | 5 | 5 | 15 | 15 | 10 |
|  | Cross-linking agent | Type | AC-7 | AC-7 | AC-7 | — | — | — |
|  |  | Parts by mass | 10 | 5 | 5 | — | — | — |
|  | Urea | Type | 1,3-DMU | Biuret | 1,1-DMU | — | — | — |
|  |  | Parts by mass | 2.5 | 2.5 | 2.5 | — | — | — |
| Evaluation | Running stability |  | Good | Good | Good | Good | Good | Good |
|  | Plasticizer resistance (%) |  | 80.2 | 73.6 | 80.0 | 69.4 | 59.2 | 65.0 |
|  | Water resistance |  | Good | Excellent | Excellent | Poor | Good | Poor |

Comparative Examples

|  |  |  | Comparative Example 4 | Comparative Example 5 | Comparative Example 6 | Comparative Example 7 |
|---|---|---|---|---|---|---|
| Composition | Resin | Type | A-4 | A-5 | A-6 | A-6 |
|  |  | Parts by mass | 100 | 100 | 100 | 100 |
|  | Filler (Pigment) | Type | — | — | UW-90 | UW-90 |
|  |  | Parts by mass | — | — | 50 | 50 |
|  | Lubricant | Type | W401 | ZnSt | W400 | W400 |
|  |  | Parts by mass | 5 | 5 | 15 | 15 |
|  | Cross-linking agent | Type | AC-7 | AC-7 | — | — |
|  |  | Parts by mass | 10 | 5 | — | — |
|  | Urea | Type | — | — | Urea | — |
|  |  | Parts by mass | — | — | 2.5 | — |
| Evaluation | Running stability |  | Good | Good | Bad | Bad |
|  | Plasticizer resistance (%) |  | 75.0 | 66.4 | 13.7 | 13.6 |
|  | Water resistance |  | Poor | Excellent | Bad | Bad |

The compositions in Table 2 are shown as in the following.

W400 CHEMIPEARL W400 (Manufactured by Mitsui Chemicals, Inc., polyolefin copolymer emulsion having 40% solid content concentration)

W4005 CHEMIPEARL W4005 (Manufactured by Mitsui Chemicals, Inc., polyolefin copolymer emulsion having 40% solid content concentration)

W401 CHEMIPEARL W401 (Manufactured by Mitsui Chemicals, Inc., polyolefin copolymer emulsion having 40% solid content concentration)

AC-7 Zircosol AC-7 (manufactured by DAIICHI KIGENSO KAGAKU KOGYO CO., LTD., 13% aqueous solution of ammonium zirconium carbonate)

UW-90 UW-90 (manufactured by Engelhard Corporation (currently BASF), clay slurry with 65% solid content concentration)

Silica MIZUKASIL P524 (manufactured by MIZUSAWA INDUSTRIAL CHEMICALS, LTD., silicon oxide (silicon dioxide))

ZnSt zinc stearate (manufactured by CHUKYO YUSHI CO., LTD., HYDERINE Z-8-36)

1,3-DMU 1,3-dimethylurea 1,1-DMU 1,1-dimethylurea

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

A composition for a protection layer of a thermal recording material of the present invention can be used as a material for a protection layer of a thermal recording body, which is widely applied in, for example, output sheets of facsimiles, industrial measurement terminals, medical terminals, handy terminals, POS systems, and ticket dispenser systems.

The invention claimed is:

1. A composition for a protection layer of a thermal recording material, the composition containing emulsion A and non-crosslinkable urea compound B, wherein
    the emulsion A has a pH of 6 or more, and consists of copolymer resin a produced by copolymerizing reactive monomer component a' containing at least a vinyl monomer component having a carboxyl group and a vinyl monomer component that is copolymerizable with the vinyl monomer component having a carboxyl group, and
    40 to 90 parts by mass of (meth)acrylonitrile is contained in 100 parts by mass of the reactive monomer component a'.

2. The composition for a protection layer of a thermal recording material according to claim 1, wherein
    (1) 1 to 40 parts by mass of the vinyl monomer component having a carboxyl group is contained in 100 parts by mass of the reactive monomer component a',
    (2) the copolymer resin a has a SP value of 9.5 (cal/cm$^3$)$^{1/2}$ or more, and
    (3) the copolymer resin a has a glass transition temperature of 20 to 130° C.

3. The composition for a protection layer of a thermal recording material according to claim 1, wherein 0.1 to 100 parts by mass of the non-crosslinkable urea compound B is contained relative to 100 parts by mass of the copolymer resin a.

4. The composition for a protection layer of a thermal recording material according to claim 1, wherein the non-crosslinkable urea compound B is a urea or urea derivative having 1 or less methylol group in its molecule.

5. The composition for a protection layer of a thermal recording material according to claim 1, wherein the non-crosslinkable urea compound B is a compound represented by formula (1) or formula (2) below:

[Chemical Formula 1]

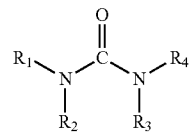

(1)

(in formula (1) above, $R_1$ to $R_4$ respectively and independently represents a hydrogen atom, or an alkyl group that has 1 to 12 carbon atoms and that may have a hydroxyl group; and two or more of $R_1$ to $R_4$ do not simultaneously have hydroxyl groups)

[Chemical Formula 2]

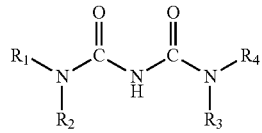

(2)

(in formula (2) above, $R_1$ to $R_4$ respectively and independently represents a hydrogen atom, or an alkyl group that has 1 to 12 carbon atoms and that may have a hydroxyl group; and two or more of $R_1$ to $R_4$ do not simultaneously have hydroxyl groups).

6. The composition for a protection layer of a thermal recording material according to claim 1, wherein the non-crosslinkable urea compound B is at least one compound selected from the group consisting of urea, 1-alkylurea, 1,1-dialkylurea, 1,3-dialkylurea, 1-hydroxyalkylurea, and biuret.

7. A thermal recording material comprising a support, a thermal recording layer, and a protection layer in this sequence,
    wherein the protection layer is formed from the composition for a protection layer according to claim 1.

* * * * *